June 9, 1936.  T. B. TYLER  2,043,784
CLUTCH MECHANISM FOR TRANSMISSIONS
Original Filed May 31, 1932  4 Sheets-Sheet 1
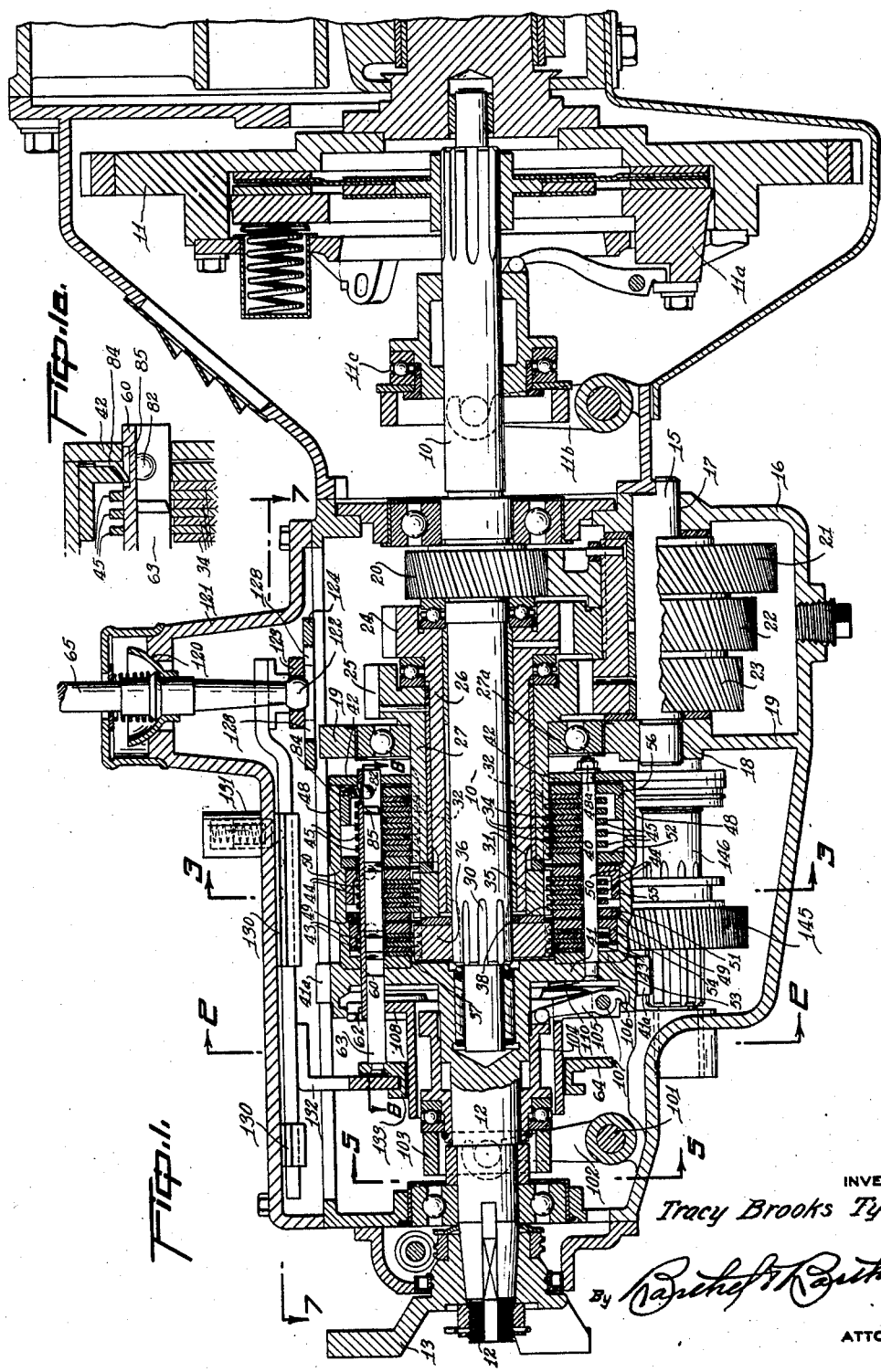
INVENTOR
Tracy Brooks Tyler
By
ATTORNEYS June 9, 1936.   T. B. TYLER   2,043,784
CLUTCH MECHANISM FOR TRANSMISSIONS
Original Filed May 31, 1932   4 Sheets-Sheet 2

INVENTOR
Tracy Brooks Tyler
BY
ATTORNEYS

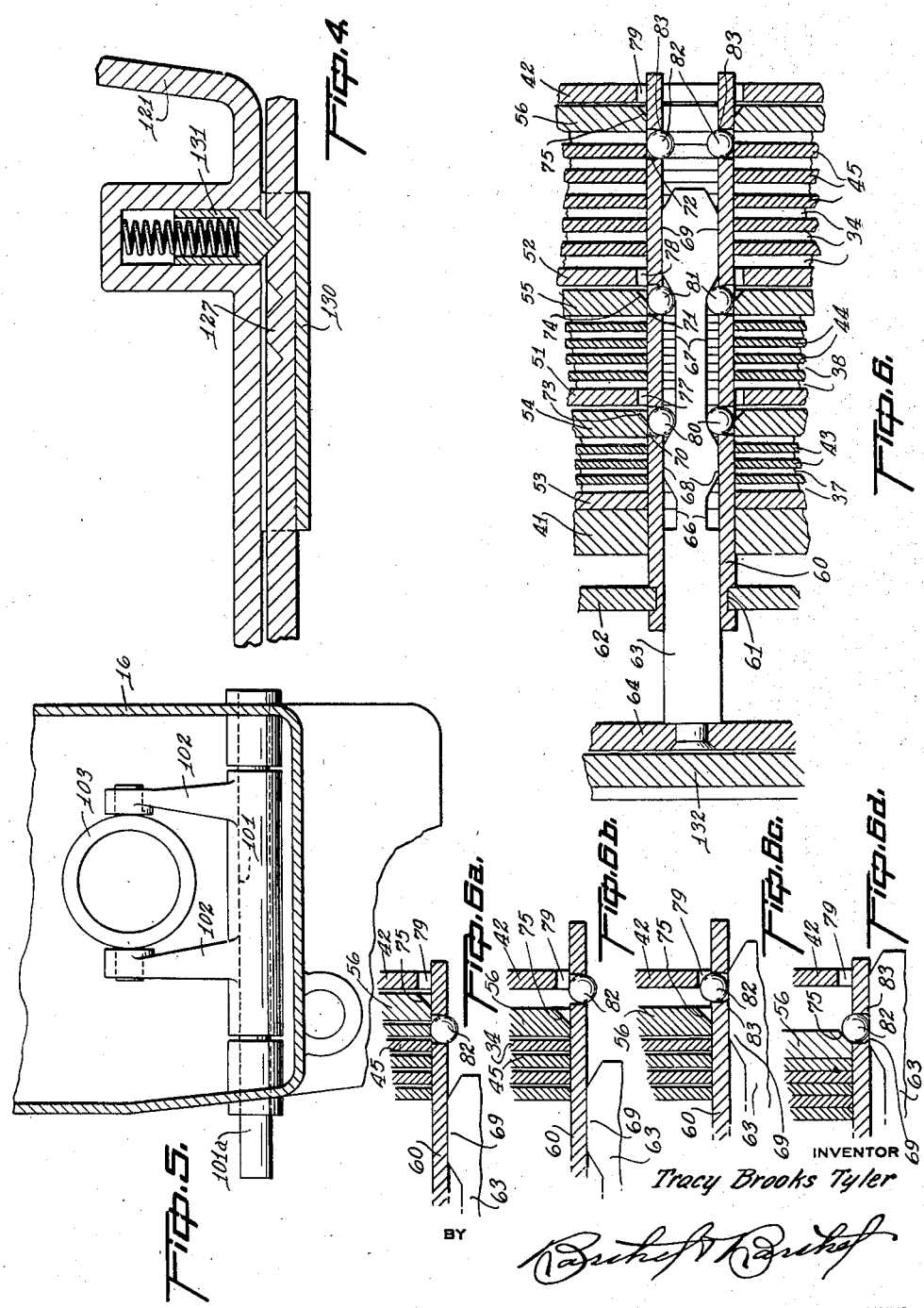

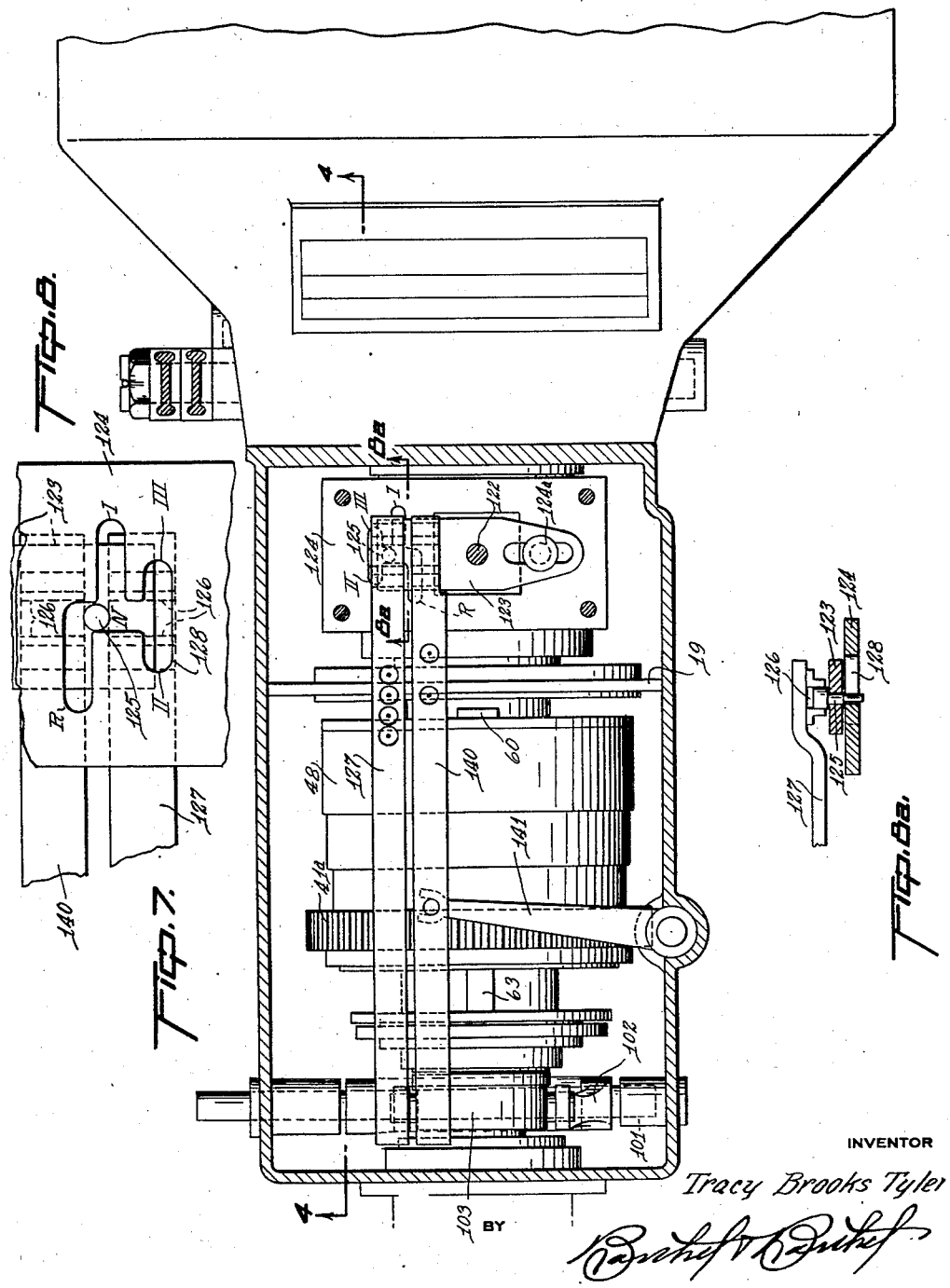

Patented June 9, 1936

2,043,784

UNITED STATES PATENT OFFICE 2,043,784

CLUTCH MECHANISM FOR TRANSMISSIONS

Tracy Brooks Tyler, Detroit, Mich., assignor to The Monopower Corporation, Detroit, Mich., a corporation of Michigan Application May 31, 1932, Serial No. 614,349
Renewed November 15, 1935

19 Claims. (Cl. 192—48)

This invention relates to transmissions such as are used with motor vehicles, industrial machinery, etc.

The principal objects of this invention are to improve the transmissions disclosed in my copending applications, Serial No. 611,384, filed May 14, 1932, and Serial No. 612,194, filed May 19, 1932. Specifically, the improvements provided may be listed as follows:

(a) The substitution of oil immersed, compact, multi-disk clutches for the dry plate clutches of application Serial No. 611,384, filed May 14, 1932.

(b) The provision of novel clutch sector means, clutch construction, clutch actuation means, etc.

(c) The provision of a transmission having pressure clutches and used in conjunction with a master clutch, there being, for the transmission clutches, a selector means, and a clutch control means, (d) And other details hereinafter described.

Still further objects of the invention will become apparent from the following detailed description of embodiments thereof and from the appended drawings, in which—

Figure 1 shows one embodiment of the invention in longitudinal vertical section;

Fig. 1a, shows a reactor and its associated parts in enlarged scale;

Figure 3:
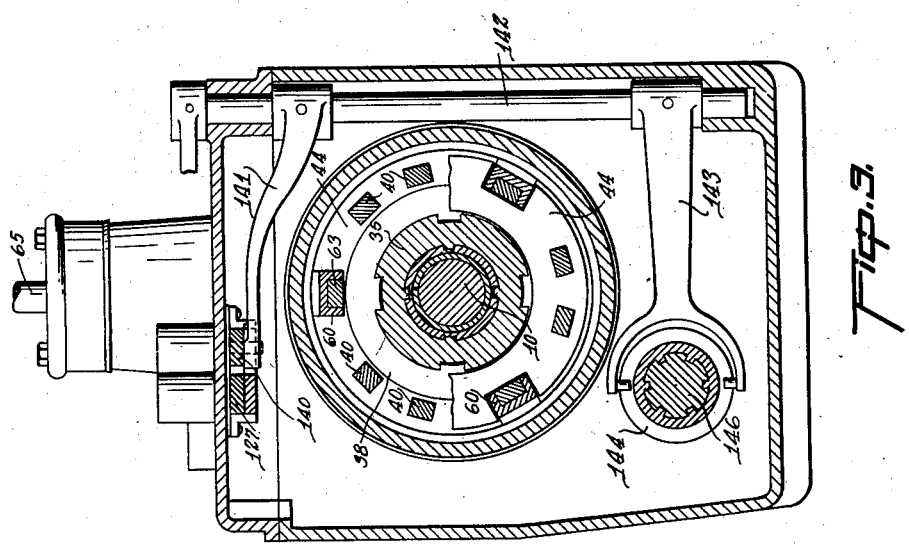
Figure 5:
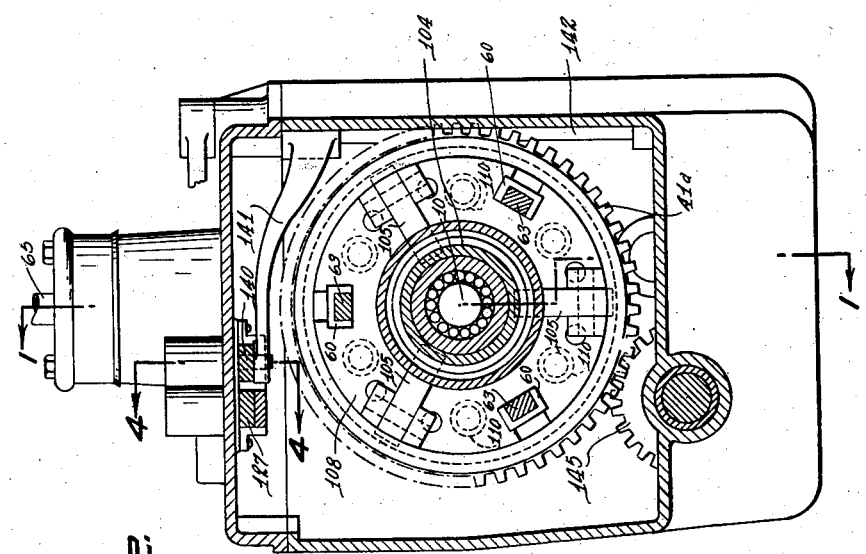

Figs. 2 and 3 are transverse sectional views as if on lines 2—2 and 3—3 of Figure 1;

Fig. 4 shows a portion of a shifter rail and associated parts, and is a longitudinal vertical section as if on line 4—4 of Figure 2;

Fig. 5 shows part of a transmission clutch actuator and is a transverse section on line 5—5 of Figure 1;

Fig. 6 shows, to enlarged scale and in plan section on line 6—6 of Figure 1, clutch selector mechanism and associated parts;

Figs. 6a, 6b, 6c and 6d are fragmentary portions of Figure 6 and show selector parts in four different positions;

Fig. 7 is a plan sectional view, as if on line 7—7 of Figure 1;

Fig. 8 shows shifter parts and is a clarified fragmentary portion of Fig. 7;

Fig. 8a shows a detail of the shifter parts as if on line 8a—8a of Fig. 7.

Referring to Figs. 1-8 showing one embodiment of the invention, and more particularly to Fig. 1, it will be seen that the transmission includes a suitably journaled main or normally driving shaft 10 connected to the engine of the vehicle through a conventional master clutch, having a driving plate 11 and a reciprocable pressure plate 11a, the latter being reciprocated by a clutch throwout fork 11b having a clutch throwout bearing 11c.

Elements, to be described in detail below, create a driving connection between the main shaft and a suitably journalled normally driven shaft 12, and the latter is connected to the propeller shaft, not shown, through a coupling 13. A counter shaft 15, fixed in the transmission casing 16 at 17, and also fixed at 18 in a partition 19 formed integral with the casing 16 is also provided, and in effect corresponds to the countershaft of a conventional transmission.

Formed integral with the main shaft 10 is a helical gear 20 in constant mesh with a gear 21 of the gear cluster of the countershaft, and the latter further has helical gears 22 and 23, of different size, as shown, constantly meshing with helical gears 24 and 25, also of different size as shown, these latter being provided with relatively telescoping sleeves 26 and 27, journalled in a bearing 27a in wall 19. The shaft 10 and the sleeves 26 and 27 are provided with external splines 30, 31 and 32 respectively for purposes to be described. Suitable thrust and journal bearings for the various parts are provided and are not referenced since their construction forms no part of the invention.

Surrounding sleeve 27 are a plurality of separated annular friction disks 34 which have teeth entering the grooves of the splines 32 of sleeve 27, the disks 34 thereby being non-rotatably, though slidably, secured to sleeve 27. Surrounding sleeve 26 and shaft 10, and splined thereto, are collars 35 and 36, these having besides their internal splines, external splines by means of which sets of friction plates 37 and 38 are splined thereto, and the three sets of plates 34, 37 and 38 form the driving plates of friction clutches whose driven parts will now be described.

Forming a constellation around the axes of shaft 10 and sleeves 26-27, (Fig. 3) are six, equally spaced rods 40, supported in the web 41 of a gear 41a formed integral with the driven shaft 12, and in a plate 42, surrounding and clear of outer sleeve 27. Floating on rods 40 and connecting all of them are sets of annular friction plates 43, 44 and 45, these being nested in sets, with the sets of plates 34, 37 and 38, as shown. The plates 43, 44 and 45 loosely surround collars 35 and 36, and sleeve 27, and are free to be moved or compressed into driving engagement with the driving plates.

The plate 42 is rigidly connected to and forms an end plate for a large cylindrical drum 48 riveted to the gear web 41 by the ends of the rods 40, the rods having nuts 48a on their ends for holding the plate 42 securely to the drum. The drum is stepped, as shown, to provide shoulders at 49 and 50 for backing plates 51 and 52, these, together with the closed end 53 of the drum, forming abutments for the sets of clutch plates 34, 37 and 38 respectively. The drum further contains dished pressure plates 54, 55 and 56, movable by means to be described, towards the backing plates to cause the sets of friction plates to be clamped between the pressure plates 54, 55 and 56 and the backing elements 53, 51 and 52 respectively for driving engagement.

The means for moving the pressure plates towards the backing plates in order to cause one or another of the clutch plate sets to be clamped includes a constellation of three channel shaped elongated members 60, disposed and spaced equally about the shafts 10 and 12, each of the members lying between two of the rods 40, as shown in Fig. 3. As seen in Fig. 6, the channels pass through the web 41, the partially closed end 53 of the drum 48, the sets of plates 43, 44, 45 and the pressure plates 54, 55 and 56, the backing plates 51 and 52 and end plate 42. At one end, by a tongue and groove joint 61, they are secured to a clutch main pressure plate 62, and at the other ends are free, as shown. Within each channel is slidably disposed an elongated selector 63, the latter having one end secured to a ring 64 operatively connected to the shift lever 65.

Each selector is provided with suitably spaced and dimensioned pairs of cutouts 66 and 67, and suitably spaced and dimensioned pairs of wide portions 68 and 69. Each channel is provided with suitably spaced pairs of holes 70, 71, 72, located substantially as shown. These holes are adjacent chamfers 73, 74, 75 on the edges of the pressure plate apertures through which the channels 60 pass, and are also adjacent reliefs 77, 78, and 79 in the holes of plates 51, 52 and 42. In the pairs of holes are pairs of balls 80, 81 and 82. The first two pairs of balls 80 and 81 are maintained in assembly by the selector, as shown, and the last mentioned pair, 82, is maintained in assembly by peened over portions 83 of the holes 72 (Fig. 6d), shown exaggerated. Further between pressure plate 56 and end plate 42 are substantially L-shaped rocker fingers or reactors 84 which have their lower edges seated in recesses 85 of channels 60, Fig. 1a.

The operation of the selectors with particular reference to the lowest speed clutch plates 34—45 may be explained as follows: Figs. 6 and 6a show the parts in neutral position. At this time, the friction plates 34 and 45 are out of driving relation, balls 82 are away from chamfer 75 and relief 79, and also clear of the wide part 69 of selector 63.

Upon movement of the clutch parts to clutch disengaged position, and in a manner to be described later, channel 60 is moved to the right, against the influence of springs to be described. Pressure plate 56 is moved to the left slightly to take up extra clearance, due to rocker fingers 84 being rocked, and all of the balls register with the adjacent chamfers and reliefs, as shown for balls 82 in Fig. 6b. The clutches are all disengaged, and the operator moves shift lever 65 to a desired position. For sake of illustration, let us say he moves the lever to low speed (high torque) position, i. e., the "low gear" position in a conventional transmission. In a manner to be described below, this action causes selector 63 to move forward two steps, upon which the wide part 69 of selector 63 will register with the balls 82 and will force them outwardly against the chamfers 75 and into reliefs 79 (Fig. 6c), where they are thus maintained, by the wide portions of the selectors. Movement of channels 60 to the left causes the outwardly held balls 82 to urge pressure plate 56 to the left (Fig. 6d), in turn causing plates 34 and 45 to be clamped between the pressure plate 56 and locking plate 52 for frictional driving engagement. So long as the lever 65 remains in "low gear" position, and so long as the clutch is "engaged", no further action will take place.

When sufficient "low gear" speed is attained, the operator first disengages the clutch, moving channels 60 to the right and again moving all the balls into registry with the chamfers and reliefs. He then moves lever 65 to "neutral" position, whereupon selector 63 moves back (left) to neutral. He then moves lever 65 to "second gear" position for engagement of plates 44 and 38 or to "third gear" position for engagement of plates 43 and 37.

One important and obviously necessary feature of the selector mechanism, lies in its ability to "select" one pair-set of plates without at the same time permitting or causing another pair-set to be engaged. This results from the dimensioning of the selector, for example, when one wide part of the selector is registered with a set of balls in line with one set of chamfers and reliefs, the other balls, chamfers and reliefs are not in registry with a selector wide part, and no action takes place at these unregistered points.

Another feature of the selector mechanism lies in its ability to "select" the plates with but an extremely small movement of the selectors. Accordingly, no more than a slight movement of the shift lever or other shifting manipulator is necessary to accomplish selection of the plates.

Since channels 60 are moved forwardly against spring pressure it is desired to have their range of movement, for clutch releasing operation, as small as possible. This desire conflicts with the necessity of having the clutch plates, especially the many-plate sets 45, 34 separated as much as possible when the plates are not in driving relation. Accordingly, in the low speed clutch 45—34 the pressure plate 56 is moved in two steps, one by the rockers 84 when the channel is moved forward, and another by the balls 82 when the channel is retracted. It will thus be seen that a great movement of pressure plate 56, necessary for clearance between the many plates of clutch 45—34, is accomplished by a small forward movement of channels 60.

In order to show how the channels 60 may be moved for clutch engagement, reference will now be had to Figs. 1 and 5, which show a cross shaft 101, provided with arms 102 yoked to a collar 103 (Fig. 5) surrounding shaft 12, adjacent to a sleeve 104, to whose end is pivotally connected the ends of three radially extending, spaced, release fingers 105, these having their other ends extending into a groove 106 formed in the rim of the non-slidable gear 41a integral with shaft 12. The fingers 105, between their ends, are pivotally connected at 107 to a main pressure plate 108 supported on the three channels 60. The forward surface of the plate and the rear surface of the web 41 have counterbores receiving coiled compression springs 110, tending to urge plate 108 to the left. The plate 108 is connected to the selector channels 60 and is the part referenced 62, on Fig. 6.

It will be seen that when the shaft 101 is rotated to the right, by means not shown, but which may be a pedal on the extension 101a, channels 60 are moved to the right, to release the pressure on the clutches and also register the selector balls with the reliefs and chamfers in the plates when in their free position.

Further, as above mentioned, movement of the selectors 63, is responsive to movement of the shifting lever. In order to show how the selectors may be manipulated, reference will now be had to Figs. 1, 4, 7, 8, and 8a, which show a lever 65, universally mounted at 120 in the transmission cover plate pedestal 121. The lower end of the lever terminates in a ball 122 seated in and universally fixed to a shifter plate 123, which is slidable on a fixed plate 124, there being a pin and slot connection 124a between them. The shifter plate is movable by the lever transversely and longitudinally, as the lever ball end 122 moves.

The shifter plate has fixed thereto a pin 125 projecting upwardly into the channel 126 of a forward drive shifter rail 127, and projecting downwardly into a slot 128 of the stationary plate 124. The slot is shaped as shown in Fig. 8, and has different length portions I, II and III corresponding to low speed drive, second speed drive, and high speed drive positions respectively. In addition slot 128 has a gate or neutral portion N, as shown. It will be observed that a reverse drive shifter rail 140 having a channel 126 is also provided for purposes to be described later.

The shifter rail 127 is mounted to slide longitudinally in guides 130 and is provided with a spring pressed or snap and check plunger 131, Fig. 4, whereby its positions are maintained for each shift. The shifter rail, at its rear end, is provided with an L-shaped fork 132 secured thereto, and engaged with a grooved ring 133, secured to the selectors 63, and forming the part that is referenced 64, Fig. 6.

It will be seen that when the lever 65 is in "neutral", the shifter plate 123, will be so positioned that the pin 125 will be in the "N" part of slot 128 (Fig. 8) and will also be in one or the other of the channels 126 of the shifter rails. Now, when the upper or handle end (not shown) of the lever 65 is moved towards the "low" speed position, its lower ball end will cause the shifter plate 123 to move on fixed plate 124 laterally so as to position pin 125 in channel 126 of rail 127, and plate 123 will then move around pin 124a as a pivot. Pin 125 will move with shifter plate 123 and will become disposed in the "I" part of slot 128, pin 125 in its movement causing the shifter rail 127, the grooved ring 133 (64) and the selectors 63, to move forwardly two steps or a distance equal to the length of part "I" of slot 128. When the lever 65 is moved to "second speed" position, it must pass through neutral position, and then to "second speed", such movement, translated through parts 123, 125, 127 and 133, causing the selectors to move through neutral position to second speed position. Similar action takes place when "third speed" is desired.

For reverse drive, there is provided a second shifter rail 140 which is picked up and moved by the shifting pin 125 only when the latter is moved in the "R" part of slot 128 by the shift lever 65.

The reverse shifter rail is connected, through a rocker crank 141 (Fig. 3) fixed to a vertical shaft 142 having fixed thereto a second rocker crank 143, to the collar 144 of a reverse gear 145, splined to and slidably mounted on a shaft 146, and adapted to mesh with the gear 41a on web 41. The shaft 146 has a gear, not shown, constantly meshing with one of the gears on the counter shaft 15, and is constantly rotated. The reverse gear 145 is the only gear that does not mesh constantly with its mating gear and is the only driving member not engaged frictionally.

It will be observed that the selector parts have a very small range of movement. Consequently, even when a conventional leverage ratio is provided, the lever 65 or other manipulator, need not be as long as those now provided, because conventional transmissions require a much greater range of movement of the selector parts. Because of the fact that the manipulator need not be so long as those commonly provided, the manipulator may be of entirely different form, and may be mounted differently from those now provided.

Further, it will be observed that the reverse part of slot 128 is out of line with the low speed part of the same slot, as seen in Fig. 8. Accordingly, when the manipulator is moved hurriedly out of low speed position it will be impossible for the same to be moved accidentally into the reverse slot, this not being true of conventional devices.

Now having described the invention and a preferred embodiment thereof, it will be understood that the scope of the same is to be limited not to the specific details herein shown and described, but only by the claims which follow.

What I claim is:—

1. In a transmission, a shaft, a plurality of longitudinally spaced normally disengaged multi-plate friction clutch sets surrounding said shaft, a drum surrounding and non-rotatably secured to said clutch sets, means parallel to the axis of said shaft and spaced therearound, and passing thru said clutch sets for selecting one of them, and means independent of said selecting means for causing clutch engagement of a pre-selected set.

2. In a transmission, a shaft, a plurality of longitudinally spaced friction clutch sets surrounding said shaft, a drum surrounding and non-rotatably secured to said clutch sets, means parallel to the axis of said shaft and spaced therearound, and passing thru said clutch sets for selecting one of them, and means for causing clutch engagement of a pre-selected set, the selector means being operable independently of the clutch engagement causing means.

3. In a transmission, a shaft, a plurality of longitudinally spaced friction clutch sets surrounding said shaft, a drum surrounding and non-rotatably secured to said clutch sets, means parallel to the axis of said shaft and spaced therearound, and passing thru said clutch sets for selecting one of them, and spring means independent of said selecting means for causing clutch engagement of a pre-selected set.

4. In a transmission, a shaft, a plurality of longitudinally spaced friction clutch sets surrounding said shaft, a drum surrounding and non-rotatably secured to said clutch sets, means parallel to the axis of said shaft and spaced therearound, and passing thru said clutch sets for selecting one of them, and personally operable means operable independently of said selecting means for causing clutch engagement of a pre-selected set.

5. In a transmission, a shaft, a plurality of longitudinally spaced friction clutch sets surrounding said shaft, a drum surrounding and non-rotatably secured to said clutch sets, means parallel to the axis of said shaft and spaced therearound, and passing thru said clutch sets for selecting one of them, and personally operable spring means independent of said selecting means for causing clutch engagement of a pre-selected set.

6. In a transmission, a plurality of clutch sets having movable pressure plates at least one of which is provided with reactor means, means for selecting one of said pressure plates and for causing partial clutch engagement movement of the plate equipped with reactors, in the event that plate is selected, and means for causing complete clutch engagement movement of the selected one of said pressure plates.

7. In a transmission, a plurality of clutch sets having movable pressure plates at least one of which is provided with reactor means, means for selecting one of said pressure plates and for causing partial clutch engagement movement of the plate equipped with reactors, in the event that plate is selected, and spring opposed means for causing complete clutch engagement movement of the selected one of said pressure plates.

8. In combination with a plurality of selectable clutches, having plates movable into and out of engagement, means for causing the plates to move out of engagement into an operative position, means for moving them out of the operative position, and means for moving them into the operative position, and then into engagement.

9. In a transmission, a plurality of clutch sets having axially spaced movable pressure plates, slidable means extending through all of said pressure plates, engaging means on said slidable means adapted to selectively and independently engage all of said pressure plates, and means for moving said slidable means.

10. In a transmission, a plurality of clutch sets having axially spaced movable pressure plates, means slidable longitudinally through said clutch sets, engaging means on said slidable means adapted to independently engage said pressure plates to prevent sliding movement of the sliding means relative to an engaged pressure plate, and means for moving said engaging means longitudinally.

11. A transmission including a plurality of coaxial clutch sets having axially spaced movable pressure plates, slidable members extending through all of said plates, selective engaging means in said slidable members corresponding to said pressure plates and independently operable to prevent movement of said sliding member relative to an engaged pressure plate, and means for moving said sliding member longitudinally.

12. A transmission including a plurality of coaxial clutch sets having axially spaced movable pressure plates, slidable members extending through all of said plates, balls carried by said slidable members adjacent each pressure plate, means for projecting said balls outwardly adjacent any selected pressure plate, and means for moving said slidable member longitudinally.

13. In a transmission, a plurality of clutch sets having axially spaced movable pressure plates, slidable means extending through all of said pressure plates, engaging members on said slidable means adapted to independently and selectively engage all of said pressure plates, and personally controlled means for moving said engaging means longitudinally.

14. A transmission including a plurality of clutches, each clutch including an axially movable pressure plate, said pressure plates in various sets being spaced along an axial line, a slidable member extending through all of said pressure plates, engaging means in said slidable member and operable to selectively engage separate pressure plates, and means for moving said slidable member longitudinally.

15. In a clutch having a pressure plate actuated by axial movement thereof, means movable in a direction to engage said pressure plate and movable in the opposite direction when said pressure plate is engaged to actuate the same, and reactor means operable to move said pressure plate in an actuating direction during movement of said first named means in a direction to engage said pressure plate.

16. In a clutch having a pressure plate actuated by axial movement thereof, slidable means, engaging means on said slidable means, said sliding means being movable in a predetermined direction to permit engagement of said engaging means with said pressure plate, and movable in an opposite direction to cause actuating movement of the engaged plate, and means carried by said slidable means and engaging said pressure plate for moving the pressure plate in an actuating direction during movement of said slidable means in said predetermined direction.

17. In a clutch having a pressure plate actuated by axial movement thereof, slidable means, engaging means on said slidable means, said sliding means being movable in a predetermined direction to permit engagement of said engaging means with said pressure plate, and movable in an opposite direction to cause actuating movement of the engaged plate, and a rocker carried by said slidable means and engaging said pressure plate for moving the pressure plate in an actuating direction during movement of said slidable means in said predetermined direction.

18. In a clutch having a pressure plate actuated by axial movement thereof, slidable means, manual means for moving said slidable means, engaging means on said slidable means, said sliding means being movable in a predetermined direction to permit engagement of said engaging means with said pressure plate, and movable in an opposite direction to cause actuating movement of the engaged plate, and means carried by said slidable means and engaging said pressure plate for moving the pressure plate in an actuating direction during movement of said slidable means in said predetermined direction.

19. In a clutch having a pressure plate actuated by axial movement thereof, slidable means adapted to be moved into engagement with said pressure plate, means for moving said slidable means in an opposite direction when in engagement with said pressure plate to move the latter in an actuating direction, and means carried by said slidable means and engaging said pressure plate to move the latter in an actuating direction during movement of said slidable means towards its position of engagement with said pressure plate.

TRACY BROOKS TYLER.